United States Patent [19]

Venema

[11] Patent Number: 4,633,213

[45] Date of Patent: Dec. 30, 1986

[54] PRESSURE TEMPERATURE SENSOR

[75] Inventor: Harry J. Venema, Wheaton, Ill.

[73] Assignee: Borg-Warner Corporation, Chicago, Ill.

[21] Appl. No.: 729,339

[22] Filed: May 1, 1985

[51] Int. Cl.⁴ .............................................. B60Q 1/00
[52] U.S. Cl. .................................... 340/60; 340/611;
  340/614; 340/626; 340/59; 73/118.1; 73/708;
  73/714; 73/729; 374/203; 374/145; 374/146;
  200/83 C; 200/83 D
[58] Field of Search ................... 340/521, 60, 59, 603,
  340/588–592, 605, 611, 612, 614, 618, 622, 626;
  374/142–146, 203; 73/118, 708, 714, 729;
  200/83 R, 83 A, 83 B, 83 C, 83 D, 81 R, DIG. 5

[56] References Cited

U.S. PATENT DOCUMENTS

| 1,815,642 | 7/1931 | Zubaty . | |
| 1,933,453 | 10/1933 | Schlaich | 177/351 |
| 2,985,870 | 5/1961 | Lindberg, Jr. . | |
| 3,302,171 | 1/1967 | Sensing | 340/57 |
| 3,338,099 | 8/1967 | Remick, Jr. et al. | 374/145 |
| 3,439,356 | 4/1969 | Kinzer | 374/143 |
| 3,852,546 | 12/1974 | Maxwell, Jr. et al. | 200/83 D |
| 3,956,935 | 5/1976 | Ford | 73/347 |
| 4,051,728 | 10/1977 | Metz | 73/343 R |
| 4,375,764 | 3/1983 | Lawford et al. | 340/614 |

Primary Examiner—Donnie L. Crosland
Attorney, Agent, or Firm—Florian S. Gregorczyk

[57] ABSTRACT

A pressure-temperature sensor for monitoring a fluid system for an over-temperature, an under-pressure or an over-pressure condition. The sensor includes a bellows operator enclosed in a fluid-filled housing with a normally-closed, first switch means and a normally-open second switch means. A diaphragm operator and a bellows are responsive to changes in temperature and pressure to, respectively, operate the first and second switches to indicate an over-temperature, an under-pressure or an over-pressure condition.

8 Claims, 4 Drawing Figures

PRESSURE TEMPERATURE SENSOR

BACKGROUND OF THE INVENTION

1. Field of the Invention

This invention discloses a multiple function sensing means for a fluid system. More specifically, this invention relates to a sensor for a vehicular coolant system. The sensor is a compact structure to monitor under pressure, over-pressure and over-temperature in a coolant system, and provides a signal means indicative of a malfunction. Coolant can boil away at normal operating temperatures if the system is open, such as with a ruptured hose or loose radiator cap.

2. Prior Art

Monitoring devices and sensors for fluid systems are known in the art, particularly temperature sensing apparatus for automobile coolant systems. There have been efforts to provide both over-pressure and over-temperature sensing devices, but not an under-pressure and over-temperature sensor. Indicative of this prior art is U.S. Pat. No. 3,439,356 (Kinzer) which discloses a pressure-temperature sensor. In this apparatus, opposed bellows chambers are coupled by a movable electrically conducting disc, which is displaced between a tube end and a thermocouple junction. The disc is moved to contact the thermocouple switch to energize a signal means and thereafter the disc is adjusted with a fluid at a known pressure to disclose an accurate pressure reading. The thermocouple is utilized in a known fashion to yield the temperature of a surrounding fluid.

U.S. Pat. No. 1,933,453—Schlaich, teaches an indicating device responsive to both temperature and pressure. However, this device requires a coil resistor 13, a temperature coil shown as bimetal coil 16, and a diaphragm operator 24. The diaphragm operator 24 is responsive to an excess pressure to open a circuit. This device provides a current from a battery, (not shown) to the end of resistor coil 13 and wiper 14 which is operable by diaphragm 24. The temperature actuation, although reasonably accurate at most temperatures, is inadequate to move the indicator for its entire distance or stroke. However, at an overheated condition sufficient for the liquid to boil vigorously, an excess pressure is disclosed that will actuate the diaphragm to move the indicator for substantially its entire travel range. A drawback noted in this device is, that until vigorous boiling occurs, the thermometer or temperature indicator does not accurately indicate the water temperature due to the difference between the water temperature and air temperature of the space surrounding the temperature responsive instrument.

U.S. Pat. No. 3,338,099—Remick, Jr., et al, teaches a boiling point indicator which utilizes two sensors, one for pressure and one for temperature. A diaphragm operator moves a mechanical indicator. There is no teaching of an electrical signal provided for such readings. This particular device is operable only as an indicator of a safe-unsafe temperature.

U.S. Pat. No. 4,051,728—Metz, teaches an instrument for monitoring a physical parameter, either temperature or pressure, utilizing an elastic sensor displaceable as a function of the monitored physical parameter. However, it is capable of only monitoring one parameter at a time. The device requires a belt having characteristics which change along the length thereof. The elastic sensor is responsive to the belt characteristic to produce an output signal which varies as a function of the physical parameter being monitored. Such a device is impractical for most automotive or vehicular usages.

Illustrative of early efforts at monitoring fluid bath temperatures is U.S. Pat. No. 1,815,642 (Zubaty) illustrating a bellows filled with a heat responsive fluid, which bellows is immersed in a fluid bath. A mechanical arm is connected between the bellows and a temperature indicator. As the fluid within the bellows is heated, the bellows is permitted to expand to move the mechanical arm and indicate the temperature. There is no teaching or consideration of pressure measurement.

U.S. Pat. No. 3,302,171—Sensing, shows two temperature sensors in cooperation with a pressure sensor. If the first temperature sensor reads too high, it is indicative of an over-pressure condition to close a circuit and provide a warning signal. Alternately, the second sensor indicates an over temperature condition to again complete a circuit and provide a warning signal. This does not provide a means for over-temperature and under-pressure measurement.

U.S. Pat. No. 2,985,870—Lindberg, teaches a device filled with a conducting fluid and at least two electrodes. If pressure is maintained as a constant, the device will provide a specific temperature reading. Alternatively, if the temperature is constant, the device will provide a specific pressure output. The change in conditions is provided by a change of state from liquid to gas within the measuring device. This change of state changes the impedance between the electrodes and provides the sensing means or signal.

U.S. Pat. No. 3,956,935—Ford, illustrates a box containing a temperature gauge, pressure gauge, a liquid differential adjustment, and a gauge adjusting device. First gauge is dependent on the claim medium and the second system gauge is relevant to the size of the coolant or fluid system. The description of the operation of this device is cursory. Therefore, it is difficult to specify the precise workings of this device.

Most vehicle coolant systems are operated at an elevated pressure which permits them to operate at a higher temperature. Generally these coolant systems are provided with relief valves to protect against an over-pressure condition. At a lower pressure the coolant will boil and evaporate from the system at a lower temperature. Therefore, it is vital to be forewarned of an under-pressure condition as well as an over-temperature condition in these coolant systems. The above devices, which require immersion in or communication with a fluid to sense either over-temperature or over-pressure, do not provide a means for measuring both an over-temperature condition and an under-pressure condition. The under-pressure condition prevails when the system fluid pressure is lost from a cooling system, such as by a loose radiator cap. An over-pressure condition exists when the system experiences a faulty relief valve radiator cap.

SUMMARY OF THE INVENTION

A pressure temperature sensor constructed in accordance with the invention includes a housing having an enclosure with a closed end and an open end. A bellows also having an open end, which is joined to the housing closed end. A flexible diaphragm operator is positioned in the open end to seal the chamber and has a spring-biased first switch means mounted on and operable by the diaphragm in the chamber to engage electrical contacts on a mounting plate in the chamber. A spring biased second switch means positioned in the bellows and operable by the bellows operator to sequentially close a pair of electrical contacts. A signal circuit connected to a source of energy is coupled to the first and second switch means which complete the signal circuit. Closure of the switch means completing the signal circuit energizes a signal means indicative of an under-pressure, over-pressure, or over-temperature condition.

BRIEF DESCRIPTION OF THE DRAWING

In the figures of the drawing like reference numerals identify like components, and in the drawing.

DETAILED DESCRIPTION OF THE INVENTION

Figure 1:
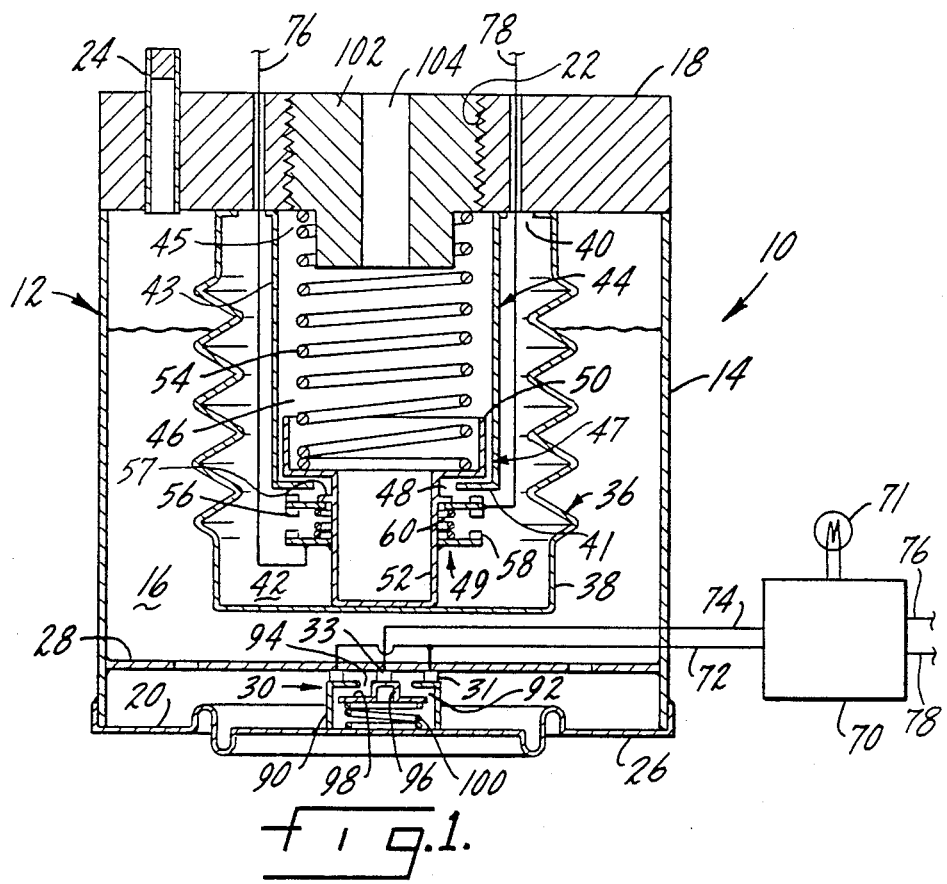
FIG. 1 is a cross section of a schematic illustration of a pressure-temperature sensor.

In FIG. 1, a pressure-temperature sensor 10 is shown with a housing 12 having a wall 14 and defining a chamber 16, a closed end 18, an open end 20, a through-bore 22 and a fluid passage 24. A diaphragm operator 26 is positioned in open end 20 to seal the open end. A mounting plate 28 is positioned in enclosure 16 and includes at least two electrical contacts 31 and 33 thereon. A first biased, normally-closed switch means 30 is mounted on diaphragm operator 26 and operable thereby to open electrical contacts 31 and 33 on mounting plate 28.

An expandable bellows operator 36 is positioned in enclosure 16. Bellows operator 36 defines a lower closed end 38 and an open upper end 40 which upper end is coincidental with through-bore 22 of housing 12. Bellows operator 36 defines a reference cavity 42 and has a casing 44 with a wall 43 positioned therein. Casing 44 defines a second cavity 46, a casing closed end 41, a casing open end 45 and a switch port 48. Positioned in reference cavity 42 is a second biased switch means 49 with a contact carrier 47 having a flange 50 in second cavity 46 and extension member 52 with a second bias means 54. Extension or protuberance 52 extends through port 48 and in a reference position contacts lower wall 38 of bellows operator 36.

Mounted on extension 52 in chamber 42 is a third contact means 58 fixed on extension 52 in close proximity to lower wall 38 and a fourth contact means 56 positioned between third contact means 58 and casing 44 and movable along extension 52. A collar 57 is positioned on protuberance 52 to retain a positioning means 60 for fourth contact means 58 at a reference position, which collar 57 can pass through switch port 48. A compressible bias or operating means 60 such as a spring is positioned between third and fourth contact means 56 and 58. The second switch means 49 includes third and fourth contact means 58, 56 as well as flange 50 and extension 52.

First switch means 30 and second switch means 49 are coupled to a signal circuit means 70 by conduit means 72, 74, 76 and 78, respectively, for first, second, third and fourth contact means. Signal circuit 70 includes a signal means 71 and a source of electrical energy which is not shown.

First switch means 30 includes a wall member 90 defining a switch chamber 92 and a first port or aperture 94 with a tube 96 and flange member 98 positioned in the switch chamber 92. Wall member 90 and tube 96 are operable by diaphragm operator 26 to open first and second contact means 31 and 33, respectively from mounting plate 28. Tube 96 is biased by a first biasing means 100 between flange 98 and diaphragm operator 26 to maintain tube 96 and second contact means 31 normally closed.

A fluid is provided to chamber 16 through fluid passage 24, which passage is thereafter sealed. A plug means 102 defines an aperture, or opening 104, which plug means 102 seals bore 22 while allowing a reference pressure to be introduced into cavity 42 through the aperture 104. The sensor 10 is inserted in a fluid system to measure either an over-temperature or an under-and over-pressure condition therein. In the case of an automobile or vehicular fluid coolant system, the under-pressure condition can occur from a loss of fluid due to a loose radiator cap, a ruptured hose, a loose spring or a weak spring in a relief valve, or a low water level. An over-temperature condition may also be sensed by sensor 10. The fluid in chamber 16 is approximately at the same volumetric ratio to chamber 16 as the total fluid volume is to the cooling system volume, and is the same fluid as is in the cooling system. Therefore, the ratio of the vapor pressure to the fluid volume within the cooling system will be reflected in the vapor pressure to fluid volume within sensor 10. Changes in pressure will therefore affect the actuation of both the pressure within the chamber 16 and that pressure acting on diaphragm operator 26.

The sensor is placed in a fluid system, not shown, and responds to changes in both temperature and pressure. In operation, diaphragm 26 flexes to open normally closed switch means 30. As shown in FIG. 1 switch means 30 moves relatively downward to initially open contact 31. Further deflection of diapragm operator 26 opens second contact 33. As the fluid system pressure and temperature increase, the temperature and pressure within chamber 16 likewise increases and bellows operator 36 moves upward thereby moving extension 52 and contacts 56 and 58 to ground. As contact 56 moves upward, it initially contacts casing 44. Further compression of bellows operator 36 will compress bias means 60 to engage contact 58 with contact 56. The operations of the switch means 30 and 49 provide the following conditions:

a low water level will be indicated by contact 56 open and contact 31 open;

a cap off a radiator of a fluid system will be indicated by an open contact 56 and open contact 33;

a faulty valve spring in a vehicular coolant system is indicated by closed contact 56 and closed contact 31; and, an over-temperature condition in a fluid system is indicated by a closed contact 56 and closed contact 58.

Figure 2:
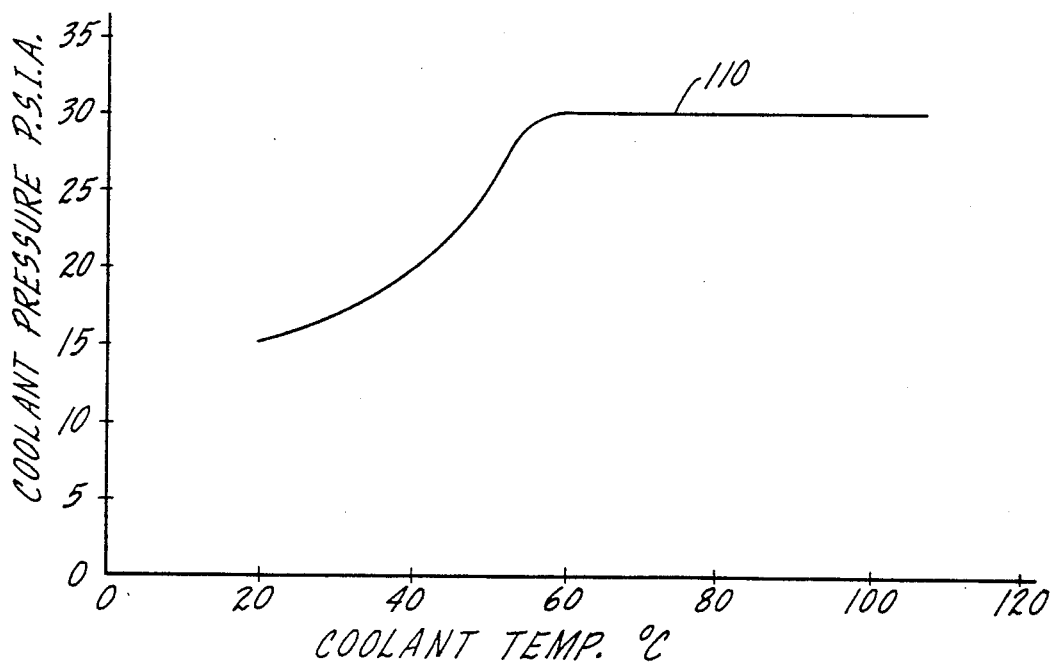
FIG. 2 is a graphical illustration of a change in pressure as a function of temperature for a coolant fluid system.
Figure 3:
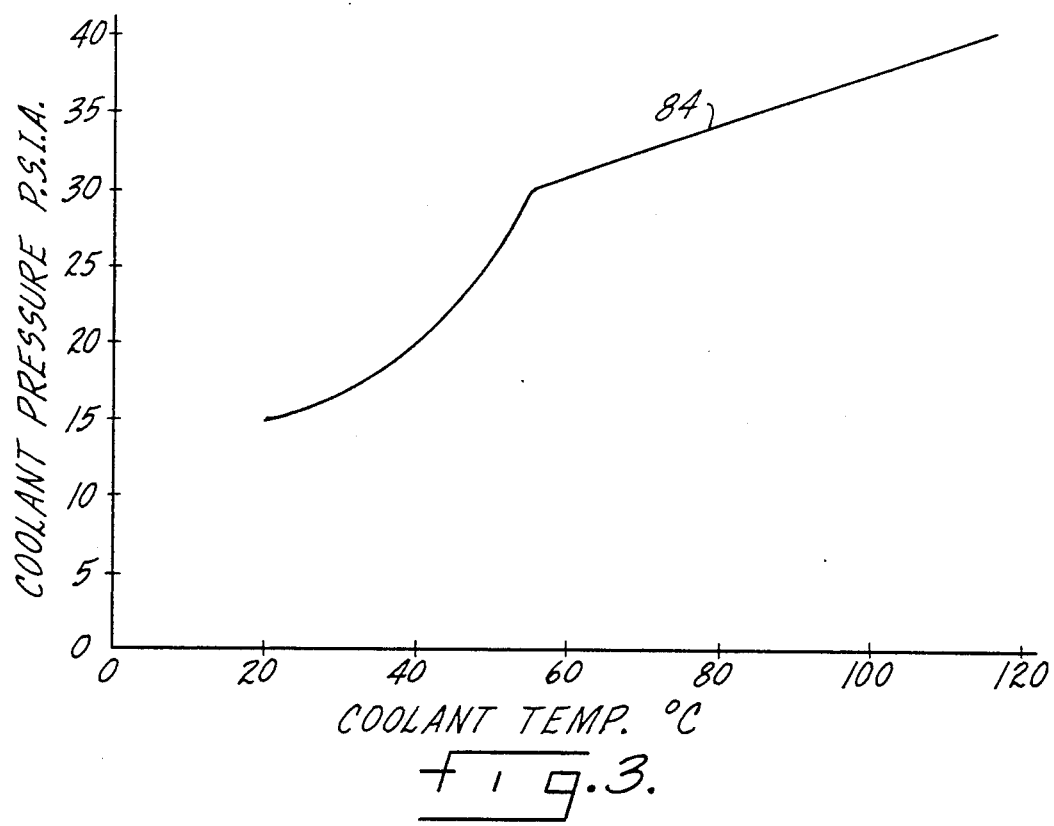
FIG. 3 illustrates a change of pressure with temperature for the present sensing unit.
Figure 4:
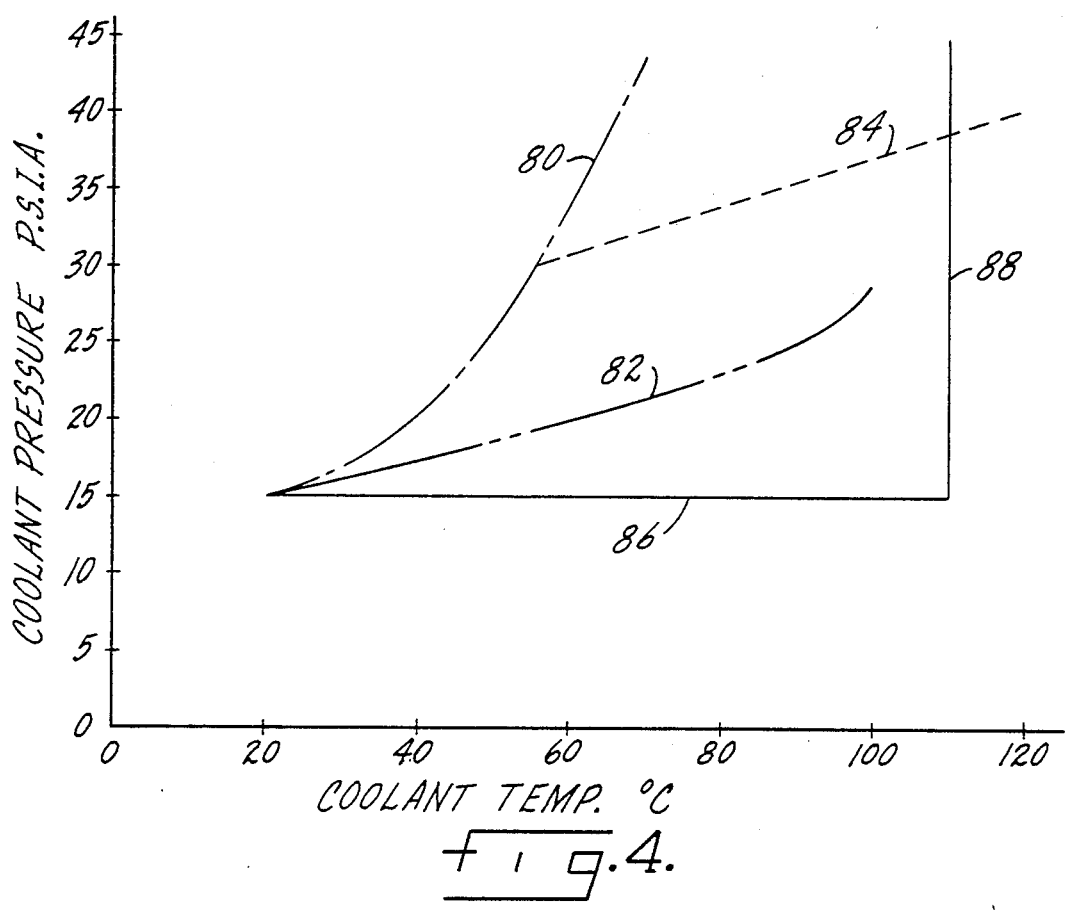
FIG. 4 is a graphical illustration of an operating curve for the various abnormal conditions.

FIGS. 2 and 3 illustrate relative changes of the pressure as a function of temperature. In FIG. 2, the standard operating condition for a vehicular cooling system is illustrated and indicates a rate of change of the vapor pressure with an increasing temperature until a straight line function 110 is provided at a temperature above which the pressure no longer rises. In FIG. 3, the pressure as a function of temperature within chamber 16 of sensor 10 is illustrated at line 84 wherein the pressure continues to rise as the system is pressurized rather than being vented to an overflow. Illustrated in FIG. 4 are some of the conditions that have been described above as measurable by the present invention. The desired change in pressure as a function of temperature is indicated by the dash line 84. Line 80 indicates the change in pressure as a function of temperature where there is a faulty relief valve spring. Line 82 indicates the function for the change in pressure as a function of temperature for a low water level. Finally, the over-temperature condition is illustrated by the straight line function 88.

Although only certain functions and a specific condition are illustrated in the present figures, it is comprehended that other similar structures can perform these operations. More specifically, signal circuits of varying configuration are known and are not specifically enumerated herein.

Those skilled in the art will recognize that certain variations can be made in the illustrated embodiment. While only a specific embodiment of the invention has been described and shown, it is apparent that various alterations and modifications can be made therein. It is, therefore, the intention of the appended claims to cover all such modifications and alterations which may fall within the true scope and spirit of the invention.

I claim:

1. A pressure-temperature sensor means for a fluid flow system which sensor comprises:
    a housing defining a fluid-filled enclosure and having a wall, an open end, a closed end, a sealed fluid passage and a through-bore;
    a signal circuit including a signal means;
    a mounting plate positioned in said enclosure having at least a first and second electrical contact mounted therein;
    a flexible diaphragm operator having a first switch means with a bias means mounted on and operable by said diaphragm which contacts said first and second electrical contacts, which are coupled to said signal circuit by a first and second conduit means, respectively;
    a bellows operator defining a reference cavity with a bellows closed end and a bellows open end, the open end coincident with said housing closed end, which seals said reference cavity;
    a normally open second switch means having a casing defining a switch port, a contact carrier with a protuberance extending through said switch port to engage said bellows operator and having a third electrical contact mounted on said protuberance in said bellows cavity, a fourth electrical contact means slidably mounted on said protuberance between said casing and said third electrical contact means with a compressible operating means between said third and fourth electrical contacts which third and fourth contacts are coupled to said signal circuit by a third conduit and fourth conduit respectively, said bellows cavity communicating with said housing through-bore to provide a reference pressure to said bellows cavity; said first switch means being operable by said diaphragm operator to open said first and second electrical contacts to energize said signal means and said second switch means operable by said bellows operator to contact said casing with said fourth contact and further operable to provide contact between said third and fourth contacts, which switch closing completes said signal circuit to energize said signal means.

2. A pressure-temperature sensor means as claimed in claim 1, wherein said compressible means between said third and fourth contacts is a spring.

3. A pressure-temperature sensor as claimed in claim 1 wherein said first switch means includes
    a wall member defining a switch chamber and a first port;
    a flange with a snout which protrudes through said first port, said first switch bias means being operable between said flexible diaphragm and said flange to bias said snout to contact said second electrical contact.

4. A pressure-temperature sensor means as claimed in claim 1 and further defining a collar about said contact carrier protuberance between said fourth electrical contact and said contact carrier to limit the upward movement of said fourth contact in the reference position.

5. A pressure-temperature sensor means as claimed in claim 1 further comprising a second bias means in said second cavity between said housing closed end and said contact carrier to maintain said protuberance in contact with said bellows closed end.

6. A pressure-temperature sensor means as claimed in claim 1 wherein said first switch bias means is a spring.

7. A pressure-temperature sensor means as claimed in claim 1 wherein said compressible operating means is a bias spring.

8. A pressure-temperature sensor means comprising:
    a housing defining an enclosure with a wall having an open end, a closed end and defining a fluid passage and a through-bore;
    a plug means defining an opening, which plug means is positioned in said through-bore;
    a flexible diaphragm operator mounted in said open end;
    a mounting plate having a first electrical contact and a second electrical contact mounted on said mounting plate which is positioned in said enclosure; said enclosure being filled with a fluid through said fluid passage, which fluid passage is thereafter sealed;
    a first switch means mounted on said diaphragm operator and having a wall member defining a switch chamber and a first port and having a flange member and snout positioned and operable in said switch chamber with said snout extending through said first port and a first bias means positioned in said switch chamber between said flange member and said diaphragm operator to bias said flange member and snout, which wall member is operable by said diaphragm operator to open said first electrical contact and said snout is biased and movable by said first bias means and said diaphragm operator to engage said second electrical contact;
    an expandable bellows operator defines a reference cavity, an open end and a closed end, which bellows operator is mounted in said enclosure with said bellows open end and said housing closed end being coincidental, said plug means opening communicating a reference pressure to said cavity;
    a casing defining a second cavity with a wall, an open end, a closed end and a switch port with said reference pressure provided in said first and second cavities;

a second switch means includes a contact carrier with a protuberance which extends through said switch port to contact said bellows closed end at a reference position; a third contact means fixed on said extension protuberance in said bellows reference cavity and a fourth contact means slidably mounted on said protuberance and having a compressible bias means between said third and fourth contact means, and a second bias means provided in said second cavity to maintain said contact carrier and protuberance in contact with said bellows closed end;

a signal circuit including a source of energy and a signal means;

a first conductor means coupled between said first contact means and said signal circuit, a second conductor means coupled between said second contact means and a signal circuit, a third conductor means coupled between said third contact and said signal circuit and a fourth conductor coupled between said fourth contact means and said signal circuit;

wherein said first switch means is opened by said diaphragm operator to close said signal circuit and said second switch means is operable by said bellows to close said signal circuit to thus energize said signal means.

* * * * *